United States Patent

[11] 3,579,235

| [72] | Inventors | Kenneth Luke Straub<br>Fort Lauderdale;<br>Wayne Gregory Shear, Pompano Beach, Fla. |
|---|---|---|
| [21] | Appl. No. | 834,432 |
| [22] | Filed | June 18, 1969 |
| [45] | Patented | May 18, 1971 |
| [73] | Assignee | The Bendix Corporation |

[54] COLLISION AVOIDANCE READOUT ON AIR TRAFFIC CONTROL RADAR BEACON SYSTEMS
5 Claims, 3 Drawing Figs.

[52] U.S. Cl. .................................................. 343/6.5,
343/6.8
[51] Int. Cl. .................................................. G01s 9/56
[50] Field of Search ........................................ 343/6.5, 6.5
(LC), 6.8, 6.8 (LC), 112.4

[56] References Cited
UNITED STATES PATENTS

| 3,136,991 | 6/1964 | De Faymoreau et al. | 343/6.5LC |
| 3,208,064 | 9/1965 | Morrel | 343/112.4 |
| 3,341,846 | 9/1967 | McMurren et al. | 343/6.8LC |

*Primary Examiner*—Rodney D. Bennett, Jr.
*Assistant Examiner*—Malcolm F. Hubler
*Attorneys*—Plante, Arens, Hartz, Hix and Smith, Bruce L. Lamb, William G. Christoforo and Lester L. Hallacher

ABSTRACT: A system for transmitting collision avoidance maneuvering information together with conventional air traffic control information by the same aircraft transponder. The transponder includes gating apparatus for adding in a serial format both the maneuvering and the control information in order to transmit a single combined response to a single air traffic controller interrogation.

Patented May 18, 1971

| CAS MANEUVER COMMANDS | BINARY WORD | | |
|---|---|---|---|
| | A | B | C |
| CLIMB | 0 | 0 | 1 |
| AIRCRAFT BELOW | 0 | 1 | 0 |
| LEVEL OFF | 0 | 1 | 1 |
| AIRCRAFT ABOVE | 1 | 0 | 0 |
| DIVE | 1 | 0 | 1 |

INVENTORS
WAYNE G. SHEAR
KENNETH L. STRAUB

BY
*William D. Christoforo*
ATTORNEY

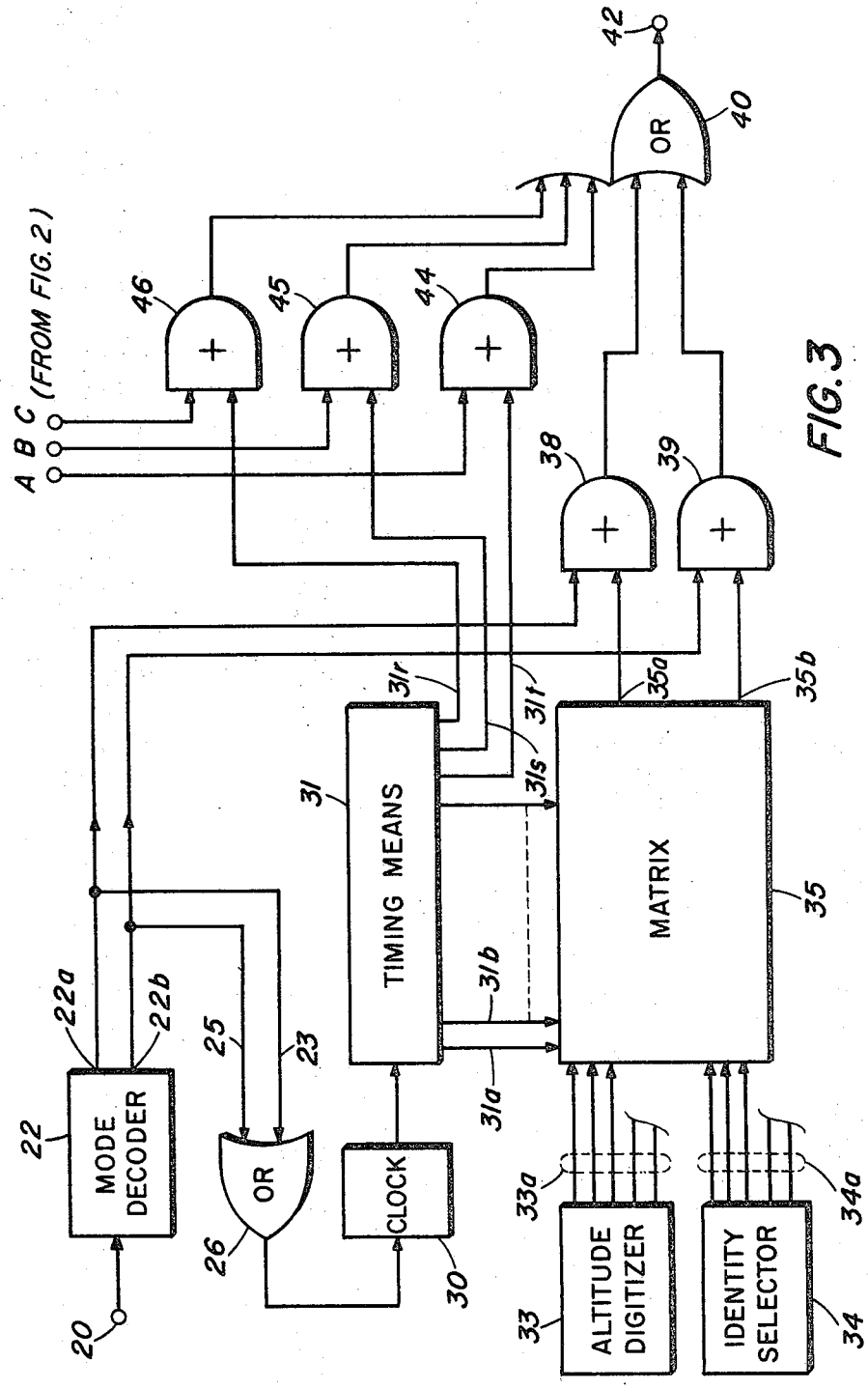

COLLISION AVOIDANCE READOUT ON AIR TRAFFIC CONTROL RADAR BEACON SYSTEMS

BACKGROUND OF THE INVENTION

This invention relates to aircraft transponder systems for use in the air traffic control radar beacon system and more particularly to such systems which are adapted to cooperate with collision avoidance systems.

Collision avoidance systems for aircraft have been proposed and certain of these systems have been reduced to practice. Generally, the type of collision avoidance system which will be used in cooperation with this invention is the type which generates specific collision avoidance maneuver commands to the pilot and additionally may optionally generate informational displays as to the state of the aircraft's surrounding airspace environment for the use of the pilot. Generally, the more sophisticated of these systems will be located aboard the protected aircraft and will gather information as to the protected aircraft's surrounding airspace environment, either independently or, more likely, in cooperation with similar collision avoidance systems located on each of the other aircraft within the environment. At the present time, three collision avoidance maneuver commands are used to eliminate a collision threat, and two informational displays are available to the pilot to show the status of the surrounding airspace environment. The three collision avoidance commands are: Climb, Level Off, Dive, while the two informational displays are: Aircraft Below, Aircraft Above. For the sake of simplicity, both the maneuver commands and informational displays will be referred to as maneuver commands herein.

It is contemplated that aircraft collision avoidance systems will remain operational even when the protected aircraft is in a ground-controlled aircraft traffic control environment and actually under control of a ground controller. It is thus possible that even when under the latter type of control where a collision threat is not to be expected, a collision threat may actually be discovered by the onboard collision avoidance system requiring the pilot to make an immediate collision avoidance maneuver. In this case it is essential that the information of this maneuver be immediately relayed to the ground controller, not only to provide the controller with notice of impending aircraft movement from its normal expected path, but also to alert the ground controller to the existing collision threat.

SUMMARY OF THE INVENTION

It is thus an object of this invention to provide means for transmitting collision avoidance maneuver information automatically from a protected aircraft to an air traffic controller.

Most commercial aircraft now have installed thereon a transponder which cooperates with the Air Traffic Control Radar Beacon System and it is contemplated that in the foreseeable future onboard transponders of this or similar types will continue to be used for air traffic control purposes. Briefly, a transponder comprises a receiver which includes a decoder for recognizing and interpreting an interrogation received from an air traffic control radar and a transmitter including an encoder for transmitting back to the radar the requested information. In the present day transponder systems, digital techniques are used for signal processing and both the interrogation and response messages are digital in content. By digitizing the maneuver commands and providing additional gating means it is possible to relay to the ground controller the maneuvering information through the existing air traffic control transponders.

It is thus another object of this invention to use, in the main, existing onboard aircraft equipment for transmitting collision avoidance maneuvering information to the air traffic controller.

Various types of information are requested by the ground controller and supplied by the responding aircraft, for example, aircraft identification information or altitude information. As aforementioned, the response is in digital format being specifically in the form of a serial binary bit train. The information to be transmitted is normally stored in a transponder storage device in a parallel format. Three types of encoding techniques are in use and well known to those skilled in the art in present day transponders to convert the parallel input information to a serial format for transmission by the transponder: (1) delay line, (2) shift register and (3) binary counter and count decoder.

In a delay line type encoder, a single pulse is introduced at the input of a delay line and picked off at appropriately spaced taps as the pulse propagates down the line. A two input AND gate is associated with each tap. Pulses from these taps are each fed to one input of an aforementioned two-input AND gate, while the other input to these gates suitably comes from an on-off storage device wherein the parallel input code is stored. If a given gate is enabled by its input code, the pulse from the delay line tap connected to that gate is transmitted. If a gate is not enabled, its corresponding pulse is not transmitted.

In the shift register encoding technique, the delay line previously described is replaced with a clock and a shift register. The first clock pulse sets a logical "1" into the first stage of the shift register and subsequent clock pulses shift the logical "1" one step with each clock pulse through the shift register. In this manner, a pulse equal in width to the period of the clock pulse is propagated through the register. Since only one element of the shift register is in the logical "1" condition at any given time, the register can be visualized as a delay line with equally spaced taps through which is propagated a single pulse. The two-input AND gates and storage device used with the delay encoding techniques and described above is used, in a manner identical to that already described, with the shift register.

A third type of transponder encoding means makes use of a clock, a binary counter and a plurality of AND gates usually in the form of a diode matrix. Each clock pulse sets the counter to a different count, which count is distinguished by the AND gates. Each count of this counter corresponds to one pulse of the transponder reply with the AND gates cooperating with the storage device to pick off the proper combination of counter outputs to produce each desired binary pulse in the response serial train.

Regardless of which of these three encoding techniques is used, additional means are provided in the transponder for generating framing pulses about the resultant serial bit train in order to identify the specific informational content of the train.

Since only three binary bits are required to identify any one of the five possible collision avoidance commands or displays, it is merely necessary to choose three of the bits in the normal response and reserve them for collision avoidance use. Although in this embodiment the capability of transmitting only five maneuver commands is shown, the various combinations of three bits will result in eight distinct words giving the system the capability of transmitting eight maneuver commands. Any one or all of the unused bit words will denote no maneuver command. Of course, the capability of transmitting even more different maneuver commands can be increased by reserving additional bits for collision avoidance use. The number of maneuver commands which can be transmitted is, of course, equal to $2^n$ where $n$ is the number of reserved bits. It is thus one more object of this invention to provide means for transmitting collision avoidance maneuvering information from a protected aircraft automatically to an air traffic controller whenever the aircraft is interrogated.

BRIEF DESCRIPTION OF THE DRAWINGS

FIG. 3 is a block diagram showing the invention as used with a standard transponder system.

DESCRIPTION OF THE PREFERRED EMBODIMENT

Figures 1, 2:
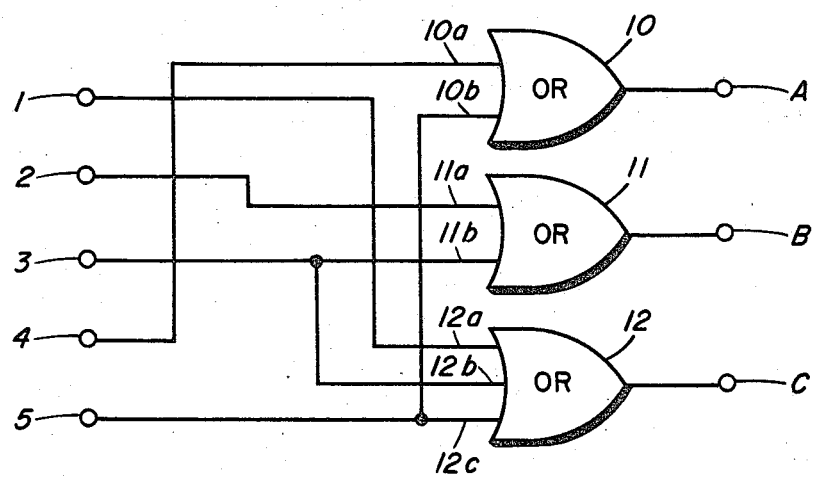
FIg. 1 is a table showing the various collision avoidance maneuver commands together with possible binary coded words which may be associated with each command.
FIG. 2 shows a gating means useful in converting collision avoidance maneuver commands into associated parallel format binary words.

Referring to the FIGS. and more particularly to FIG. 1, there is seen a table which includes the five collision avoidance maneuver commands previously mentioned, namely, Climb, Aircraft Below, Level Off, Aircraft Above and Dive. It is, of course, possible to transmit any one of these collision avoidance maneuver commands by transmitting a preselected binary word. It is well known that three binary bits are required to construct eight different and unique binary words. Five of these words are arbitrarily selected to be associated with each of the five maneuver commands. These arbitrarily selected binary words are shown immediately adjacent to their associated maneuver commands in the table. Columns A, B and C refer to terminals A, B and C of FIG. 2 whereon a maneuver command binary word is stored in parallel bit format when generated by the collision avoidance system.

FIG. 2 shows a gating means which conveniently encodes a maneuver command into its associated binary word in a parallel bit format. The collision avoidance system (not shown) of the type contemplated for use with this invention samples the airspace environment surrounding the protected aircraft. These collision avoidance systems are well known and generally include a computer which, in accordance with the information supplied thereto, displays the collision threat at the protected aircraft and generates maneuver commands. A maneuver command is manifested at the computer output terminals suitably by the change of electrical state of one of the plurality of these terminals to thus energize a light, sound an alarm or energize other suitable pilot warning devices. Referring to FIG. 2 terminal 1 is connected to that collision avoidance system computer output terminal whose energization signifies the generation of the Climb maneuver command. Terminal 2 is connected to that collision avoidance system computer output terminal whose energization signifies the generation of the Aircraft Below command. In like manner, terminals 3, 4 and 5 are connected to those collision avoidance system computer output terminals whose energization signifies the generation of the Level Off, Aircraft Above and Dive maneuver commands, respectively.

When the collision avoidance system generates a Climb maneuver command, terminal 1 will be energized thus energizing output terminal C so that the resultant binary word appearing on output terminals A, B and C in parallel format will correspond to the proper binary word shown in the table of FIG. 1. If the Aircraft Below maneuver command is generated, input terminal 2 is energized with the result that only output B is energized and the proper binary word appears at the output terminals of the gating means. In like manner the Level Off maneuver command energizes output terminals B and C, the Aircraft Above maneuver command generates output terminal A and the Dive maneuver command energizes output terminals A and C.

Although transponder systems are well known in the art, it will be instructive at this time to briefly describe their operation. A ground controller transmits through a directional antenna an interrogation comprised of three serially arranged pulses. The second of these pulses is used to eliminate side lobe interference and it is not necessary to understand its function to understand the teachings of this invention, thus no further mention will be made thereof. The time spacing between the first and last pulses, by prearranged convention, signifies the type of response desired from the responding aircraft and is referred to in the art as an interrogation mode. For example, pulses spaced 8 microseconds apart are referred to as a mode 3A interrogation and signifies that a response identifying the aircraft is desired. Pulses spaced 21 microseconds apart are referred to as a mode C interrogation signifying that a response identifying the aircraft's altitude is desired. Other modes are of course possible, the number of modes being limited only by the ability of the aircraft to decipher the pulses.

Referring now to FIG. 3, an aircraft transponder receiving an interrogation will apply the video content thereof onto input terminal 20 of mode decoder 22 which includes means of determining the time spacing between the two pulses comprising the interrogation period. In this embodiment it is assumed that only one of two possible interrogation modes will be received during any one interrogation: either mode 3A signifying an identity response is desired or mode C signifying an altitude response is desired. Mode decoder 22 suitably includes a delay line having taps time spaced corresponding to the time spacing of the interrogation pulses which are to be decoded and a number of gates having inputs connected to the delay line taps so as to generate a pulse at a proper gate when an interrogation is decoded. Monostable multivibrators are energized when the interrogation is decoded to energize terminal 22a when mode 3A interrogation is identified and to energize terminal 22b when mode 3C interrogation is identified. These terminals remain energized long enough for the proper response to be transmitted as will be explained more fully below. Of course, only one or the other of terminal 22a or 22b will be energized in response to a given interrogation. These terminals are connected via lines 23 and 25 respectively to the inputs of OR gate 26 which upon the identification of either interrogation mode passes a signal therethrough to clock 30 which is thereby activated.

Timing means 31 comprises any one of the group of well-known encoders useful for converting a parallel format binary word into a serial format binary word. Three of these encoders which are in use in present day transponders were previously described herein as delay line type, shift register type or binary counter type. Where timing means 31 comprises a delay line type encoder, clock 30 is suitably a monostable multivibrator which generates a single pulse of proper width for transmission to the ground upon being triggered by the signal passing through gate 26. The delay line output taps, for example, taps 31a, 31b, etc. are connected to matrix 35 which is made up of a plurality of two input AND gates, each of which receives as one input the signal from a delay line tap and receives as a second input a signal from either altitude digitizer 33 or identity selector 34.

Where delay 31 comprises a shift register type encoder clock 30 will be energized to generate a train of clock pulses which are applied to the shift register. In the manner previously explained, a logical "1" will move through the register generating time spaced pulses at the register outputs 31a, 31b etc., for example, in a similar manner as the delay line type encoder. Where the delay 31 comprises a counter and count decoder, clock 30 will generate a train of pulses as was the case with the shift register. The counter counts these pulses and the counter state is decoded by the count decoder in the manner well known in the art. As before, pulses will appear in time sequence on output taps 31a, 31b etc., for example.

Altitude information is stored in altitude digitizer 33 in binary parallel format and supplied to matrix 35 in the identical format via lines 33a with one binary bit appearing on each of the above-mentioned lines. In like manner aircraft identity information is stored in identity selector 34 and supplied to matrix 35 via lines 34a.

Matrix 35 is comprised of two sets of two-input AND gates. Each gate of the first set has one input terminal connected to one of the altitude digitizer output lines 33a and has the other input terminal connected to one of the timing means output taps, for example, 31a etc. The output terminals of each gate in the first set of gates are connected in common to matrix output terminal 35a. Each gate of the second set has one input terminal connected to one of the identity selector output lines 34a and has the other input terminal connected to one of the timing means output taps, for example, 31a etc. The output terminals of each gate in the second set of gates are connected in common to matrix output terminal 35b. Since only one of the timing means output taps 31a, 31b etc. will be energized at any one time, only one gate in the first set of gates and one gate in the second set of gates will be qualified at the same time. Thus, in a manner which is well known to those skilled in the aircraft transponder art, matrix 35 responds to the time-spaced pulses generated by timing means 31 to convert the parallel bit altitude data in altitude digitizer 33 into a serial bit format at matrix output terminal 35a and converts the parallel bit identity data in identity selector 34 into a serial bit format at matrix output terminal 35b. The encoding means is comprised of three OR gates 10, 11 and 12 with the input terminals 10a and 10b to OR gate 10 being connected to terminals 4 and 5, input terminals 11a and 11b of OR gate 11 being connected to terminals 2 and 3 and the input terminals 12a, 12b and 12c of OR gate 12 being connected to terminals 1, 3 and 5.

It will be remembered that only one of the mode decoder output terminals 22a or 22b is energized by an interrogation depending upon what interrogation mode has been identified. Where interrogation mode 3A has been identified, terminal 22a is energized and gate 38 is opened thus allowing the serial format binary data on terminal 35a to proceed through gate 38 and OR gate 40 to output terminal 42 from whence it is transmitted by the transponder transmitter (not shown) to the ground controller. If interrogation mode C has been identified, terminal 22b will be energized thus opening gate 39 to allow the serial bit formated data on output terminal 35b to pass therethrough and similarly through OR gate 40 to output terminal 42 for transmission to the ground controller. It can thus be seen that only one of the gates 38 or 39 will be energized during any given interrogation so that only that information actually desired will be transmitted to the ground control.

In order to transmit the maneuver commands to the ground controller, three additional output taps 31r, 31s and 31t are provided from timing means 31. These taps are not normally used for formating a response to either the mode 3A or mode C interrogation but are used to add to each response information as to collision avoidance system generated maneuver commands.

Maneuver command output taps 31r, 31s, and 31t can be time spaced with respect to the regular output taps 31a, 31b etc. in any convenient predetermined manner. Thus the maneuver command taps might be time placed after the last regular output tap or be time interspaced with the regular output taps or in any other convenient combination thereof. Output tap 31t is connected as one input to AND gate 44, output tap 31s is connected as one input to AND gate 45 and output tap 31r is connected as one input to AND gate 46. Terminals A, B and C which are also shown in FIG. 2 are connected as the other input to gates 44, 45 and 46, respectively. During the response to an interrogation, those gates 44, 45 and 46 will be qualified in accordance with parallel bit information stored on terminals A, B and C, which information, as aforementioned, identifies the collision avoidance maneuver command thus allowing the pulse traversing through timing means 31 and appearing on output taps 31r, 31s and 31t in proper time-spaced relationship to pass through the proper qualified gates so as to superimpose information as to the collision avoidance maneuver command into the regular transponder response by interspacing the pulses identifying the maneuver command into the pulse train comprising the regular transponder response.

I claim:
1. In an aircraft having a collision avoidance system for generating maneuver command signals and an air traffic control transponder including means for storing various air traffic control information in a first parallel binary bit format and first means responsive to a received interrogation from an interrogator requesting a specific portion to a first serial binary bit format having predetermined normally unused bits, encoding means for inserting information identifying said maneuver commands into said first serial binary bit format comprising:
   second means for converting said maneuver command signals into a second serial binary bit format synchronously with said normally unused bits; and,
   means for combining said first and second serial binary bit formats into a serial binary bit train for transmission to said interrogator.

2. Encoding means as recited in claim 1 wherein said second means comprises:
   means responsive to said maneuver command signals for formulating binary words in a second parallel bit format defining said maneuver commands; and,
   means for converting said second parallel bit format into said second serial binary bit format synchronously with said normally unused bits.

3. Encoding means as recited in claim 2 wherein said first means includes a timing means for generating pulses in accordance with a predetermined time schedule and a plurality of gates responsive to said pulses and said first parallel bit format for selecting in predetermined timed sequence certain of said first parallel bits, said plurality of gates being nonresponsive to predetermined of said pulses, said second means being responsive to said predetermined pulses for selecting certain of said second parallel bits.

4. Encoding means as recited in claim 3 wherein said second means comprises:
   a second plurality of gates, each said gate being qualified by a separate one of said predetermined pulses for passing a predetermined bit of said second parallel bits; and,
   means for combining in ordered timed sequence said bits passed by said second plurality of gates.

5. Encoding means as recited in claim 3 wherein said second means comprises a plurality of two-input coincident gates, each said coincident gate having as a second said input a separate one of said second parallel bits.